United States Patent
Oshima et al.

(10) Patent No.: US 9,716,557 B2
(45) Date of Patent: Jul. 25, 2017

(54) CALIBRATION DEVICE

(71) Applicant: Mitsubishi Electric Corporation, Tokyo (JP)

(72) Inventors: Tadashi Oshima, Tokyo (JP); Toshio Wakayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/303,257

(22) PCT Filed: May 12, 2014

(86) PCT No.: PCT/JP2014/062600
§ 371 (c)(1),
(2) Date: Oct. 11, 2016

(87) PCT Pub. No.: WO2015/173861
PCT Pub. Date: Nov. 19, 2015

(65) Prior Publication Data
US 2017/0033876 A1    Feb. 2, 2017

(51) Int. Cl.
*H04B 7/04* (2017.01)
*H04B 17/21* (2015.01)
(Continued)

(52) U.S. Cl.
CPC ............... *H04B 17/21* (2015.01); *H04B 1/06* (2013.01); *H04B 7/02* (2013.01); *H04B 7/04* (2013.01)

(58) Field of Classification Search
CPC ... H04B 1/06; H04B 7/02; H04B 7/04; H04B 7/084; H04B 7/086; H04B 17/21
See application file for complete search history.

(56) References Cited

U.S. PATENT DOCUMENTS

2006/0293087 A1    12/2006    Tsutsui
2010/0117890 A1*    5/2010    Vook ................ H04B 17/21
                                                    342/174

(Continued)

FOREIGN PATENT DOCUMENTS

JP    2007-005974 A    1/2007
JP    2007-304118 A    11/2007
JP    2014-003430 A    1/2014

OTHER PUBLICATIONS

International Search Report issued in PCT/JP2014/062600; mailed Aug. 12, 2014.

(Continued)

*Primary Examiner* — David B. Lugo
(74) *Attorney, Agent, or Firm* — Studebaker & Brackett PC

(57) ABSTRACT

A calibration device includes reference signal normalizing units 5-1 to 5-M that set, as a reference signal, a frequency domain signal being associated with either one 2 of reception antennas and being included in frequency domain signals obtained by conversions made by Fourier transform units 4-1 to 4-M, and divide the frequency domain signals after the conversion made by the Fourier transform units 4-1 to 4-M by the reference signal, thereby normalizing the frequency domain signals, and reference frequency normalizing units 6-1 to 6-M that normalize the frequency domain signals normalized by the reference signal normalizing units 5-1 to 5-M by using a signal having a reference frequency included in the frequency domain signals.

7 Claims, 7 Drawing Sheets

(51) Int. Cl.
    *H04B 7/02*     (2017.01)
    *H04B 1/06*     (2006.01)

(56) References Cited

U.S. PATENT DOCUMENTS

2012/0027066 A1* 2/2012 O'Keeffe ............... H01Q 1/246
                                                    375/224
2016/0294488 A1* 10/2016 Sun ....................... H04B 17/102

OTHER PUBLICATIONS

Yamada; Array Calibration Technique for High-Resolution Direction of Arrival Estimation; Information and Communication Engineers Paper Magazine B; 2009; pp. 1308-1321; vol. J92-B No. 9.
Shimada et al.; Blind Array Calibration Technique for Non-uniform Linear Array by Using ICA; Information and Communication Engineers Paper Magazine B; 2008; pp. 980-988; vol. J91-B No. 9.
Written Opinion issued in PCT/JP2014/062600; mailed Aug. 12, 2014.

* cited by examiner

CALIBRATION DEVICE

TECHNICAL FIELD

The present invention relates to a calibration device that compensates for the amplitude and phase errors occurring in a plurality of antennas which construct an array antenna that receives a radio wave, a light wave, an acoustic wave, or the like.

BACKGROUND ART

Because the receiving capability of a plurality of antennas which construct an array antenna degrades remarkably when amplitude errors and phase errors occur among signals received by the plurality of antennas, calibration devices that compensate for such amplitude errors and phase errors have been developed.

A calibration device disclosed in the non-patent literature 1 as listed below uses a calibration method of estimating an amplitude error and a phase error occurring in each antenna by injecting a signal for calibration from between each antenna and a receiving unit, extracting a signal for calibration outputted from each receiving unit, and making a comparison between those signals for calibration.

However, this calibration method cannot eliminate an error which each antenna body has. Further, because an amplitude error and a phase error occurring in each antenna have secular changes, it is necessary to provide a mechanism for injecting a signal for calibration and making a comparison between signals for calibration at regular intervals.

As a calibration method of compensating for amplitude errors and phase errors occurring in the whole of a device including antenna bodies and receiving units, there is a method of receiving a signal whose direction of arrival is known and which is emitted from a radiation source by using a plurality of antennas, and making a comparison in amplitude and in phase among signals received by the plurality of antennas, thereby estimating an amplitude error and a phase error occurring in each of the antennas.

However, in this calibration method, it is necessary to prepare a plurality of radiation sources that emit signals whose directions of arrival are known. Further, in order to deal with secular changes in the amplitude error and the phase error occurring in each of the antennas, it is necessary to repeatedly carry out the above-mentioned estimating process at regular intervals.

In the non-patent literature 2 as listed below, as a process for solving the above-mentioned problem, a method of performing a calibration by using a radiation source that emits a signal whose direction of arrival is unknown is disclosed.

According to this method, on the assumption that the amplitude error and the phase error occurring in each of the antennas do not have an angular dependence, a model in which received signals are multiplied by an array error matrix expressed by the dimensions which are (the number of array elements)×(the number of array elements) is generated, and a calibration is performed by estimating the array error matrix.

However, it is described in the non-patent literature 1 that in this method, the assumption is made that the array error matrix is a diagonal matrix, but this assumption is not established under a complicated reflection environment in the vicinity of the sensor.

CITATION LIST

Non Patent Literatures

Non Patent Literature 1: Yamada, "Array calibration technique for high-resolution direction of arrival estimation", Information and Communication Engineers Paper Magazine B, Vol. J92-B No. 9, pp. 1308-1321.

Non Patent Literature 2: Shimada, Yamada, and Yamaguchi, "Blind array calibration method for non-uniform interval linear array using independent component analysis", Information and Communication Engineers Paper Magazine B, Vol. J91-B No. 9, pp. 980-988.

SUMMARY OF INVENTION

Technical Problem

Because conventional calibration devices are configured as above, a problem is that unless a plurality of radiation sources that emit signals whose directions of arrival are known are prepared, amplitude errors and phase errors occurring in a plurality of antennas which construct an array antenna cannot be estimated.

A further problem is that in order to deal with a secular change in the amplitude error and the phase error occurring in each of the antennas, it is necessary to repeat the above-mentioned process of estimating errors at regular intervals, separately from the process of estimating the direction of arrival of a signal emitted from an unknown radiation source.

The present invention is made in order to solve the above-mentioned problems, and it is therefore an object of the present invention to provide a calibration device that can estimate amplitude errors and phase errors occurring in a plurality of antennas when estimating the direction of arrival of an unknown signal, without preparing, in advance, a radiation source that emits a signal whose direction of arrival is known.

Solution to Problem

According to the present invention, there is provided a calibration device including: an array antenna to receive an unknown signal whose direction of arrival is unknown; a signal converter to convert signals received by a plurality of element antennas which construct the array antenna, into frequency domain signals; a reference signal normalizer to set, as a reference signal, either a frequency domain signal being associated with either one of the element antennas and being selected from among the frequency domain signals obtained by the conversion made by the signal converter, or a frequency spectrum of the unknown signal acquired in advance, and to normalize the frequency domain signals by using the reference signal; a reference frequency normalizer to normalize the frequency domain signals normalized by the reference signal normalizer, by using a signal having a reference frequency which is included in the frequency domain signals normalized by the reference signal normalizer; a direction of arrival estimator to estimate the direction of arrival of the unknown signal by using the frequency domain signals normalized by the reference frequency normalizer; and an amplitude and phase error estimator to estimate amplitude errors and phase errors occurring in the plurality of antennas by using both the direction of arrival estimated by the direction of arrival estimator and the frequency domain signals normalized by the reference signal normalizer.

Advantageous Effects of Invention

Because the calibration device according to the present invention is configured to include the reference signal normalizer to set, as a reference signal, either a frequency domain signal being associated with either one of the element antennas and being selected from among the frequency domain signals obtained by the conversion made by the signal converter, or a frequency spectrum of the unknown signal acquired in advance, and to normalize the frequency domain signals by using the reference signal; and the reference frequency normalizer to normalize the frequency domain signals normalized by the reference signal normalizer, by using a signal having a reference frequency which is included in the frequency domain signals normalized by the reference signal normalizer, there is provided an advantage of being able to estimate amplitude errors and phase errors occurring in the plurality of reception antennas while estimating the direction of arrival θ of the unknown signal with a high degree of accuracy, without preparing, in advance, a radiation source that emits a signal whose direction of arrival is known.

DESCRIPTION OF EMBODIMENTS

Hereafter, the preferred embodiments of the present invention will be explained in detail with reference to the drawings.

Embodiment 1

Figure 1:
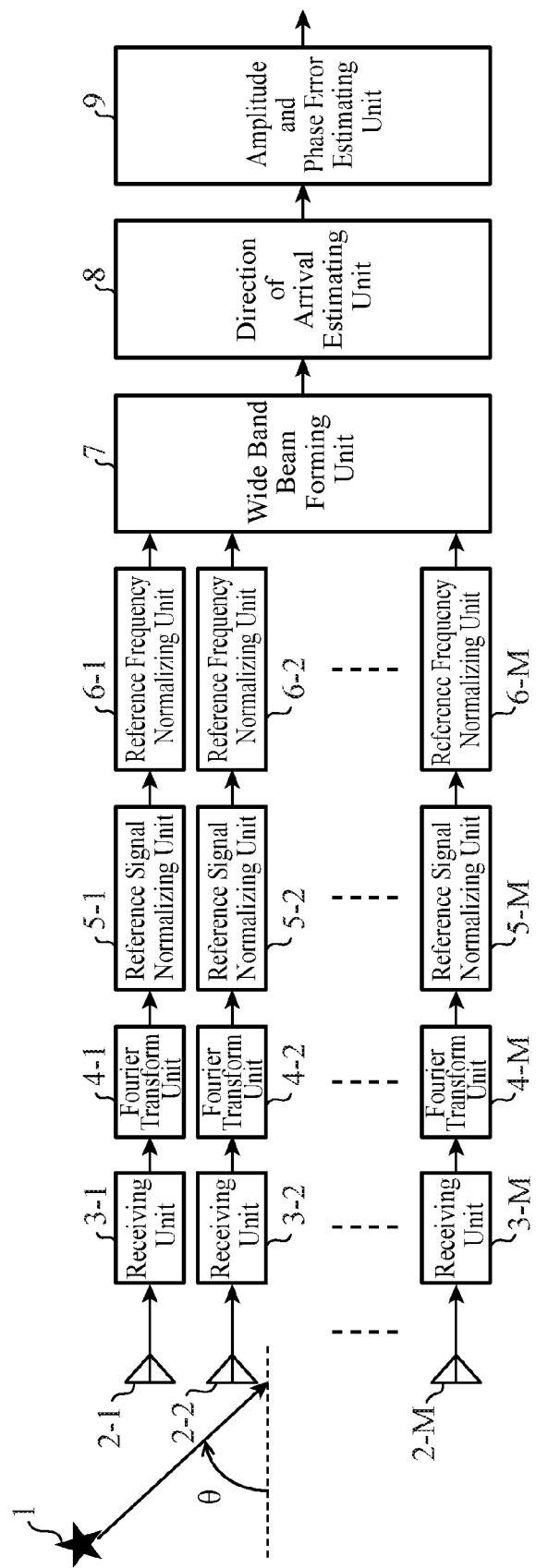
FIG. 1 is a block diagram showing a calibration device according to Embodiment 1 of the present invention.

FIG. 1 is a block diagram showing a calibration device according to Embodiment 1 of the present invention.

Referring to FIG. 1, a radiation source 1 is either a signal source that emits a signal whose direction of arrival θ is unknown, or a reflector that reflects a signal emitted from another radiation source.

Reception antennas 2-1 to 2-M are element antennas that construct an array antenna, and receive a signal whose direction of arrival θ is unknown.

Each of receiving units 3-1 to 3-M performs various signal processes (e.g., a signal amplifying process, a bandpass filtering process, a frequency conversion process and an A/D conversion process) on an RF signal which is a corresponding one of signals received by the reception antennas 2-1 to 2-M, thereby acquiring a baseband complex signal which is digital signal, and outputs the baseband complex signal to a corresponding one of Fourier transform units 4-1 to 4-M.

The calibration device can be configured in such a way as to, when the digital signals acquired by the receiving units 3-1 to 3-M are IF real signals, perform a Hilbert transform and digital orthogonal detection on the IF real signals, thereby acquiring baseband complex signals.

The Fourier transform units 4-1 to 4-M perform respective processes of performing FFTs (Fast Fourier Transforms) on the baseband complex signals outputted from the receiving units 3-1 to 3-M, thereby converting the baseband complex signals into signals in a frequency domain (referred to as "frequency domain signals" from here on).

A signal converter is comprised of the receiving units 3-1 to 3-M and the Fourier transform units 4-1 to 4-M.

Although each of the Fourier transform units performs an FFT on a baseband complex signal in this embodiment, the process performed by each of the Fourier transform units is not limited to the FFT as long as the process is one of converting a baseband complex signal into a frequency domain signal. For example, each of the Fourier transform units can alternatively perform a DFT (Discrete Fourier Transform) on a baseband complex signal.

Reference signal normalizing units 5-1 to 5-M set, as a reference signal, the frequency domain signal associated with either one 2 of the reception antennas and included in the frequency domain signals obtained by the conversion made by the Fourier transform units 4-1 to 4-M, and perform respective processes of dividing the frequency domain signals obtained by the conversion made by the Fourier transform units 4-1 to 4-M, by the reference signal, thereby normalizing the frequency domain signals. The reference signal normalizing units 5-1 to 5-M construct a reference signal normalizer.

Although in this embodiment the reference signal normalizing units set, as the reference signal, the frequency domain signal associated with either one 2 of the reception antennas, when a frequency spectrum of the signal emitted from the radiation source 1 is acquired in advance, the reference signal normalizing units can alternatively set, as the reference signal, the frequency spectrum.

Reference frequency normalizing units 6-1 to 6-M perform respective processes of normalizing the frequency domain signals normalized by the reference signal normalizing units 5-1 to 5-M by using a signal having a reference frequency which is included in the frequency domain signals normalized by the reference signal normalizing units 5-1 to 5-M. The reference frequency normalizing units 6-1 to 6-M construct a reference frequency normalizer.

A wide band beam forming unit 7 performs a process of forming a beam pattern in a wide band by using the frequency domain signals normalized by the reference frequency normalizing units 6-1 to 6-M.

A direction of arrival estimating unit 8 performs a process of detecting the peak of the beam pattern formed by the wide band beam forming unit 7, thereby estimating the direction of arrival θ of the signal emitted from the radiation source 1.

A direction of arrival estimator is comprised of the wide band beam forming unit 7 and the direction of arrival estimating unit 8.

An amplitude and phase error estimating unit 9 performs a process of estimating amplitude errors and phase errors occurring in the reception antennas 2-1 to 2-M by using both the direction of arrival θ estimated by the direction of arrival estimating unit 8 and the frequency domain signals normalized by the reference signal normalizing units 5-1 to 5-M. The amplitude and phase error estimating unit 9 constructs an amplitude and phase error estimator.

In the example shown in FIG. 1, although it is assumed that the reception antennas 2-1 to 2-M, the receiving units 3-1 to 3-M, the Fourier transform units 4-1 to 4-M, the reference signal normalizing units 5-1 to 5-M, the reference frequency normalizing units 6-1 to 6-M, the wide band beam forming unit 7, the direction of arrival estimating unit 8 and the amplitude and phase error estimating unit 9, which are the components of the calibration device, consist of pieces of hardware for exclusive use (for example, it can be assumed that the components other than the reception antennas 2-1 to 2-M and the receiving units 3-1 to 3-M consist of semiconductor integrated circuits each equipped with a CPU, or one chip microcomputers), a part of the calibration device can consist of a computer.

For example, in the case in which the components other than the reception antennas 2-1 to 2-M and the receiving units 3-1 to 3-M consist of a computer, a program in which the details of the processes performed by the Fourier transform units 4-1 to 4-M, the reference signal normalizing units 5-1 to 5-M, the reference frequency normalizing units 6-1 to 6-M, the wide band beam forming unit 7, the direction of arrival estimating unit 8 and the amplitude and phase error estimating unit 9 can be stored in a memory of the computer, and a CPU of this computer can be made to execute the program stored in the memory.

Next, operations will be explained.

The reception antennas 2-1 to 2-M which construct the array antenna receive a signal which is emitted from the radiation source 1 and whose direction of arrival θ is unknown.

Each of the receiving units 3-1 to 3-M performs various signal processes (e.g., a signal amplification process, a band-pass filter process, a frequency conversion process and an A/D conversion process) on an RF signal which is a signal received by the corresponding one of the reception antennas 2-1 to 2-M, thereby acquiring a baseband complex signal which is a digital signal, and outputs the baseband complex signal to the corresponding one of the Fourier transform units 4-1 to 4-M.

When receiving the baseband complex signals from the receiving units 3-1 to 3-M, the Fourier transform units 4-1 to 4-M perform respective FFTs on the baseband complex signals, thereby converting the baseband complex signals into signals in the frequency domain, and output the frequency domain signals to the reference signal normalizing units 5-1 to 5-M.

When receiving the frequency domain signals from the Fourier transform units 4-1 to 4-M, in order to remove the influence of the frequency spectrum of the radiation source 1, the reference signal normalizing units 5-1 to 5-M set, as the reference signal, the frequency domain signal associated with either one 2 of the reception antennas and included in the frequency domain signals obtained by the conversion made by the Fourier transform units 4-1 to 4-M, and divide the frequency domain signals obtained by the conversion made by the Fourier transform units 4-1 to 4-M, by the reference signal, thereby normalizing the frequency domain signals.

Although in this embodiment the frequency domain signal associated with either one 2 of the reception antennas is set as the reference signal, when the frequency spectrum of the signal emitted from the radiation source 1 is acquired in advance, the reference signal normalizing units can alternatively set the frequency spectrum as the reference signal, and divide the frequency domain signals obtained by the conversion made by the Fourier transform units 4-1 to 4-M, by the reference signal, thereby normalizing the frequency domain signals.

The frequency domain signal x[m, k] normalized by each of the reference signal normalizing units 5-1 to 5-M is expressed by the following equation (1).

$$x[m, k] = \gamma_m(f_c + k\Delta f) \cdot \exp\left(j2\pi(f_c + k\Delta f)(m-1)\frac{d}{c}\sin\theta\right) + n[m, k] \quad (1)$$

In the equation (1), m (m=1, 2, ..., M) denotes an element number of each reception antenna 2, and k (k=−K/2, ..., 0, ..., K/2−1) denotes an index number of each frequency.

Further, $\gamma_m(f)$ denotes the complex amplitude at the frequency f for the m-th reception antenna 2-m, and means an amplitude error and a phase error occurring in the reception antenna 2-m.

$f_c$ denotes the center frequency of the signal emitted from the radiation source 1, d denotes the length of each of element intervals between the reception antennas 2-1 to 2-M, c denotes the speed of light, θ denotes the direction of arrival of the signal emitted from the radiation source 1, and n[m, k] denotes receiver noise at the frequency index k included in the signal received by the m-th reception antenna 2-m.

In this embodiment, for the sake of simplicity, it is assumed that the element intervals of d between the reception antennas 2-1 to 2-M are equal, and the reception antennas 2-1 to 2-M are aligned in a line. As an alternative, the element intervals of d between the reception antennas 2-1 to 2-M can be not equal, and the reception antennas 2-1 to 2-M can be arranged in two dimensions.

When receiving the normalized frequency domain signals x[m, k] from the reference signal normalizing units 5-1 to 5-M, in order to remove the influence of the amplitude errors and the phase errors occurring in the reception antennas 2-1 to 2-M, the reference frequency normalizing units 6-1 to 6-M divide the frequency domain signals x[m, k] by the signal having the reference frequency which is included in the frequency domain signals x[m, k], thereby normalizing the frequency domain signals.

If the complex amplitude $\gamma_m(f)$ is constant in the frequency band of each of the frequency domain signals x[m, k], the above-mentioned equation (1) can be expressed as the following equation (2).

$$x[m, k] \approx \gamma_m(f_c) \cdot \exp\left(j2\pi(f_c + k\Delta f)(m-1)\frac{d}{c}\sin\theta\right) + n[m, k] \quad (2)$$

By dividing the frequency domain signals x[m, k] expressed by the equation (2) by the signal x[m, 0] having the reference frequency (in this case, the frequency domain signal whose k=0 is set as the reference signal), thereby normalizing the frequency domain signals x[m, k], the calibration device can remove the influence of the amplitude errors and the phase errors occurring in the reception antennas 2-1 to 2-M.

$$\tilde{x}[m, k] \equiv \frac{x[m, k]}{x[m, 0]} \approx \exp\left(j2\pi k\Delta f(m-1)\frac{d}{c}\sin\theta\right) \mid \tilde{n}[m, k] \quad (3)$$

In the equation (3), x-tilde[m, k] denotes each of the frequency domain signals normalized by the reference frequency normalizing units 6-1 to 6-M.

Because the symbol "~" over any letter cannot be expressed in the documents of the description because of constraints on electronical applications, the expression "x-tilde" or the like will be used.

In the following, the first term on the right-hand side of the equation (3) is referred to as a "normalized steering vector." In the equation (3), the influence of the complex amplitudes and the phase errors occurring in the reception antennas 2-1 to 2-M is removed, and only the direction of arrival θ of the signal emitted from the radiation source 1 is an unknown parameter.

The wide band beam forming unit 7 forms a beam pattern in a wide band by using the frequency domain signals x-tilde [m, k] normalized by the reference frequency normalizing units 6-1 to 6-M.

More specifically, the wide band beam forming unit 7 forms a beam pattern in a wide band by using the normalized steering vector (the first term on the right-hand side of the equation (3)) and varying the direction of arrival θ, as shown in the following equation (4).

$$P(\tilde{\theta}) = vec(\tilde{a}_{m,k}(\tilde{\theta}))^H vec(\tilde{x}[m,k])$$ (4)

In the equation (4), P (θ-tilde) denotes the beam pattern in the wide band, and vec (•) denotes an operation of rearranging the matrix in (•) in a column direction, to vectorize the matrix.

Further, a-tilde$_{m,k}$ (θ) denotes the normalized steering vector, and H denotes complex conjugate transpose.

After the wide band beam forming unit 7 forms the beam pattern P (θ-tilde) in the wide band, the direction of arrival estimating unit 8 detects the peak (maximum) of the beam pattern P (θ-tilde).

After detecting the peak of the beam pattern P (θ-tilde), the direction of arrival estimating unit 8 identifies the direction corresponding to the peak, and notifies the direction corresponding to the peak, as the direction of arrival θ of the signal emitted from the radiation source 1, to the amplitude and phase error estimating unit 9.

When being notified about the direction of arrival θ from the direction of arrival estimating unit 8, the amplitude and phase error estimating unit 9 substitutes the direction of arrival θ into the equation (2) showing the frequency domain signal x[m, k] normalized by each of the reference signal normalizing units 5-1 to 5-M, thereby estimating the amplitude error and the phase error which are indicated by the complex amplitude $\gamma_m(f)$ for the corresponding one of the reception antennas 2-1 to 2-M.

The amplitude and phase error estimating unit applies, for example, a least square method to the estimation of the complex amplitude $\gamma_m(f)$. The amplitude and phase error estimating unit can estimate the amplitude error from the absolute value of the complex amplitude $\gamma_m(f)$, and can also estimate the phase error from the phase of the complex amplitude $\gamma_m(f)$.

As can be seen from the above description, because the calibration device according to this Embodiment 1 is configured in such a way as to include the reference signal normalizing units 5-1 to 5-M that set, as a reference signal, a frequency domain signal associated with either one 2 of the reception antennas and included in frequency domain signals obtained by the conversion made by the Fourier transform units 4-1 to 4-M, and divide the frequency domain signals obtained by the conversion made by the Fourier transform units 4-1 to 4-M, by the reference signal, thereby normalizing the frequency domain signals, and the reference frequency normalizing units 6-1 to 6-M that normalize the frequency domain signals x[m, k] normalized by the reference signal normalizing units 5-1 to 5-M by using a signal having a reference frequency which is included in the frequency domain signals x[m, k], there is provided an advantage of being able to estimate amplitude errors and phase errors occurring in the plurality of reception antennas 2-1 to 2-M while estimating the direction of arrival θ of an unknown signal with a high degree of accuracy, without preparing, in advance, a radiation source that emits a signal whose direction of arrival is known.

Embodiment 2

Although in above-mentioned Embodiment 1 the example in which the amplitude errors and the phase errors occurring in the reception antennas 2-1 to 2-M are constant in the frequency bands of the signals received by the reception antennas 2-1 to 2-M is explained, there can be a case in which the amplitude errors and the phase errors occurring in the reception antennas 2-1 to 2-M are not constant in the frequency bands of the received signals.

In this Embodiment 2, a calibration device that can estimate amplitude errors and phase errors occurring in reception antennas 2-1 to 2-M with a high degree of accuracy even when the amplitude errors and the phase errors occurring in the reception antennas 2-1 to 2-M are not constant in the frequency bands of signals received by the reception antennas 2-1 to 2-M will be explained.

Figure 2:
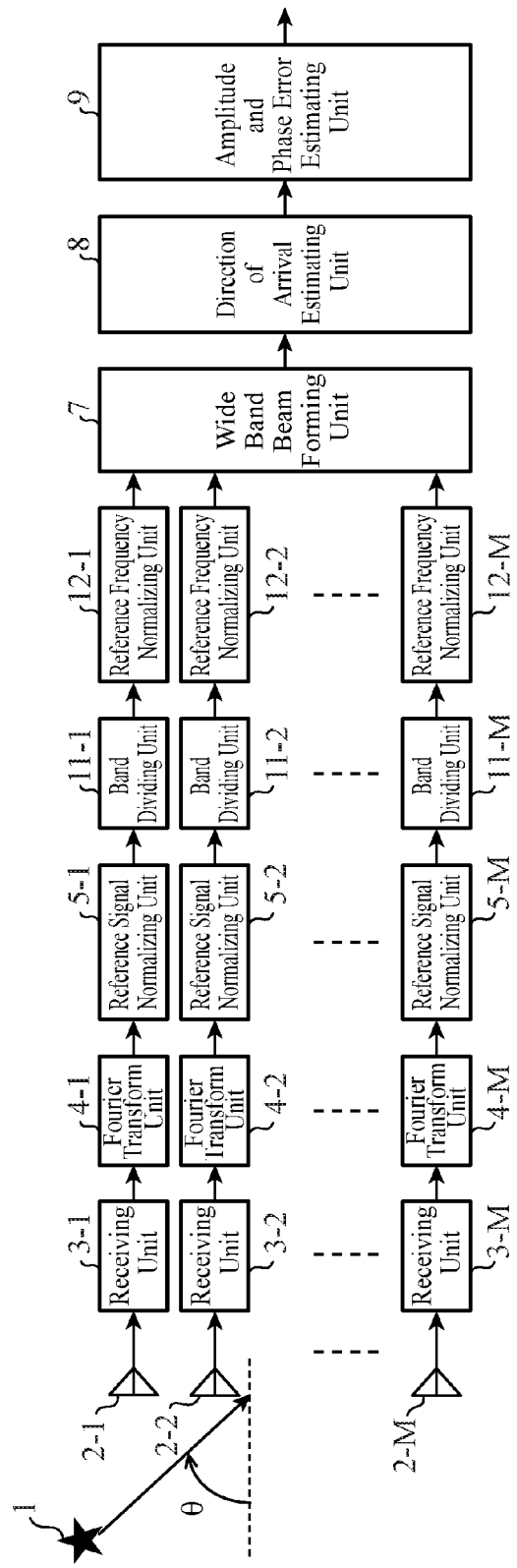
FIG. 2 is a block diagram showing a calibration device according to Embodiment 2 of the present invention.

FIG. 2 is a block diagram showing the calibration device according to Embodiment 2 of the present invention. In the figure, because the same reference numerals as those shown in FIG. 1 denote the same components or like components, the explanation of the components will be omitted hereafter.

Band dividing units 11-1 to 11-M are comprised of, for example, a semiconductor integrated circuit equipped with a CPU, or a one chip microcomputer, and perform respective processes of dividing frequency domain signals x[m, k] normalized by reference signal normalizing units 5-1 to 5-M into signals in a plurality of frequency bands. The band dividing units 11-1 to 11-M construct a band divider.

Reference frequency normalizing units 12-1 to 12-M are comprised of, for example, a semiconductor integrated circuit equipped with a CPU, or a one chip microcomputer, and perform respective processes of, for each of the frequency bands obtained by the division performed by the band dividing units 11-1 to 11-M, normalizing frequency domain signals falling within this frequency band by using a signal having a reference frequency which is included in the frequency domain signals falling within the frequency band. The reference frequency normalizing units 12-1 to 12-M construct a reference frequency normalizer.

Next, operations will be explained.

When reference signal normalizing units 5-1 to 5-M normalize frequency domain signals obtained by the conversion made by Fourier transform units 4-1 to 4-M, and output the normalized frequency domain signals x[m, k], in the same way as that shown in above-mentioned Embodiment 1, the band dividing units 11-1 to 11-M divide the frequency domain signals x[m, k] into signals in a plurality of frequency bands.

The widths of the plurality of frequency bands into which the frequency domain signals x[m, k] are divided differ for each actual system, and are determined by the frequency characteristics of amplitude errors and phase errors occurring in the reception antennas 2-1 to 2-M and those occurring in receiving units 3-1 to 3-M. The widths of the frequency bands into which the frequency domain signals are divided can be determined by using a method of actually injecting analog signals and measuring the widths, other than a method of determining the widths by performing prior simulation computations.

For each of the frequency bands obtained by the division performed by the band dividing units 11-1 to 11-M, the reference frequency normalizing units 12-1 to 12-M determine a reference frequency (e.g., the center frequency of the frequency band after the division).

After determining the reference frequency, for each of the frequency bands obtained by the division performed by the band dividing units 11-1 to 11-M, the reference frequency normalizing units 12-1 to 12-M divide the frequency domain signals falling within this frequency band obtained by the division, by the signal having the determined reference frequency, thereby normalizing the frequency domain signals falling within the frequency band obtained by the division.

A wide band beam forming unit 7 forms a beam pattern in a wide band by using the frequency domain signals normalized by the reference frequency normalizing units 6-1 to 6-M and falling within each of the frequency bands obtained by the division.

Because the details of subsequent processes are the same as those explained in above-mentioned Embodiment 1, a detailed explanation of the subsequent processes will be omitted hereafter.

As can be seen from the above description, because the calibration device according to this Embodiment 2 is configured in such a way that the calibration device includes the band dividing units 11-1 to 11-M that divide frequency domain signals x[m, k] normalized by the reference signal normalizing units 5-1 to 5-M into signals in a plurality of frequency bands, and, for each of the frequency bands obtained by the division performed by the band dividing units 11-1 to 11-M, the reference frequency normalizing unit 12-1 to 12-M normalize the frequency domain signals falling within this frequency band by using a signal having a reference frequency which is included in the frequency domain signals falling within the frequency band, there is provided an advantage of being able to estimate amplitude errors and phase errors occurring in the reception antennas 2-1 to 2-M with a high degree of accuracy even when the amplitude errors and the phase errors occurring in the reception antennas 2-1 to 2-M are not constant within the frequency bands of signals received by the reception antennas 2-1 to 2-M.

Embodiment 3

Although in above-mentioned Embodiments 1 and 2, the receiving units 3-1 to 3-M acquire baseband complex signals from the signals received by the reception antennas 2-1 to 2-M, and the Fourier transform units 4-1 to 4-M perform respective FFTs on the baseband complex signals, thereby converting the baseband complex signal into frequency domain signals, when the SNRs (signal-to-noise power ratios) of the received signals are low, the frequency domain signals cannot be acquired with a high degree of accuracy.

Further, when the reference signal normalizing units 5-1 to 5-M normalize the frequency domain signals, the noise component may be amplified if a component close to zero is included in the frequency spectrum of the signal emitted from the radiation source 1.

To solve this problem, in this Embodiment 2, a calibration device that can improve the SNRs of signals received by reception antennas 2-1 to 2-M, and acquire frequency domain signals with a high degree of accuracy will be explained.

Figure 3:
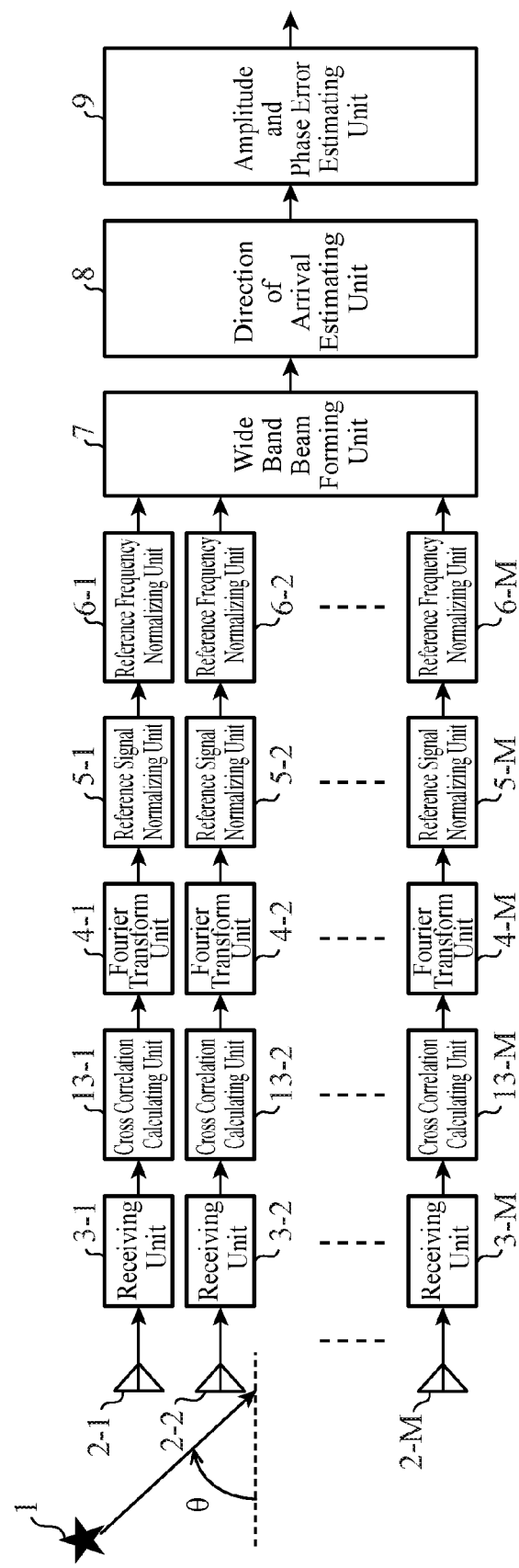
FIG. 3 is a block diagram showing a calibration device according to Embodiment 3 of the present invention.

FIG. 3 is a block diagram showing the calibration device according to Embodiment 3 of the present invention. In the figure, because the same reference numerals as those shown in FIG. 1 denote the same components or like components, the explanation of the components will be omitted hereafter.

Cross correlation calculating units 13-1 to 13-M are comprised of, for example, a semiconductor integrated circuit equipped with a CPU, or a one chip microcomputer, and set, as a reference signal, a baseband complex signal associated with either one 2 of the reception antennas and included in baseband complex signals outputted from receiving units 3-1 to 3-M, calculate cross correlations between the baseband complex signals outputted from the receiving units 3-1 to 3-M and the above-mentioned reference signal, perform respective SNR improving processes of improving the SNRs of the baseband complex signals outputted from the receiving units 3-1 to 3-M by using results of the cross correlations, and perform respective processes of outputting the baseband complex signals on which the SNR improving processes are performed to Fourier transform units 4-1 to 4-M. The cross correlation calculating units 13-1 to 13-M construct a cross correlation calculator.

Although in this embodiment the cross correlation calculating units set, as the reference signal, the baseband complex signal associated with either one 2 of the reception antennas, when a baseband complex signal of a signal emitted from a radiation source 1 is acquired in advance, the cross correlation calculating units can alternatively set the baseband complex signal as the reference signal.

Next, operations will be explained.

When the receiving units 3-1 to 3-M output baseband complex signals, the cross correlation calculating units 13-1 to 13-M set, as the reference signal, the baseband complex signal associated with either one 2 of the reception antennas in the same way as that shown in above-mentioned Embodiment 1, and calculate cross correlations between the baseband complex signals outputted from the receiving units 3-1 to 3-M, and the above-mentioned reference signal.

The cross correlation calculating units can calculate these cross correlations by performing convolution operations in a time domain.

As an alternative, the cross correlation calculating units can calculate these cross correlations by performing multiplications in the frequency domain, in order to reduce the amount of computation.

Although in this embodiment the cross correlation calculating units set, as the reference signal, the baseband complex signal associated with either one 2 of the reception antennas, when the baseband complex signal of the signal emitted from the radiation source 1 is acquired in advance, the cross correlation calculating units can alternatively set the baseband complex signal as the reference signal.

After calculating the cross correlations between the baseband complex signals outputted from the receiving units 3-1 to 3-M, and the reference signal, the cross correlation calculating units 13-1 to 13-M detect the peaks of the absolute values of the cross correlation values (i.e., the signal emitted from the radiation source 1).

After detecting the peaks of the absolute values of the cross correlation values, the cross correlation calculating units 13-1 to 13-M output signals in the vicinity of the peaks (signals each having a high SNR) in the baseband complex signals to the Fourier transform units 4-1 to 4-M.

The cross correlation calculating units can be configured in such a way as to perform zero padding after extracting signals in the vicinity of the peaks, thereby increasing the number of frequency points.

As can be seen from the above description, because the calibration device according to this Embodiment 3 is configured in such a way that the cross correlation calculating units 13-1 to 13-M set, as a reference signal, a baseband complex signal associated with either one 2 of the reception antennas and included in baseband complex signals outputted from the receiving units 3-1 to 3-M, calculate cross correlations between the baseband complex signals outputted from the receiving units 3-1 to 3-M and the above-mentioned reference signal, perform respective SNR improving processes of improving the SNRs of the baseband complex signals outputted from the receiving units 3-1 to 3-M by using results of the cross correlations, and output the baseband complex signals on which the SNR improving processes are performed to the Fourier transform units 4-1 to 4-M, there is provided an advantage of being able to acquire the frequency domain signals with a high degree of accuracy even when the SNRs of the signals received by the reception antennas 2-1 to 2-M are low.

Further, because the frequency domain signals obtained by the conversion made by the Fourier transform units 4-1 to 4-M can be smoothed, there is provided an advantage of being able to suppress the amplification of noise occurring when the reference signal normalizing units 5-1 to 5-M normalize the frequency domain signals.

In order to improve the SNRs, cross correlation arithmetic operations which take a longer time are needed, and, as a result, the amount of computation of the FFTs increase. Therefore, by dividing the baseband complex signal and the reference signal into some blocks, and, after performing cross correlation arithmetic operations for each of the blocks, performing FFTs between the blocks, long-time cross correlation arithmetic operations can be performed with a relatively-low amount of computation.

Embodiment 4

Although in above-mentioned Embodiments 1 to 3 the example in which the calibration device receives a signal which is emitted from the single radiation source 1 and whose direction of arrival θ is unknown, and estimates the direction of arrival θ and amplitude errors and phase error occurring in the reception antennas 2-1 to 2-M is shown, the calibration device can be configured in such a way as to estimate the directions of arrival θ of signals emitted from a plurality of radiation sources 1, and estimate amplitude errors and phase error occurring in the reception antennas 2-1 to 2-M for each of the directions of arrival θ of the signals.

Figure 4:
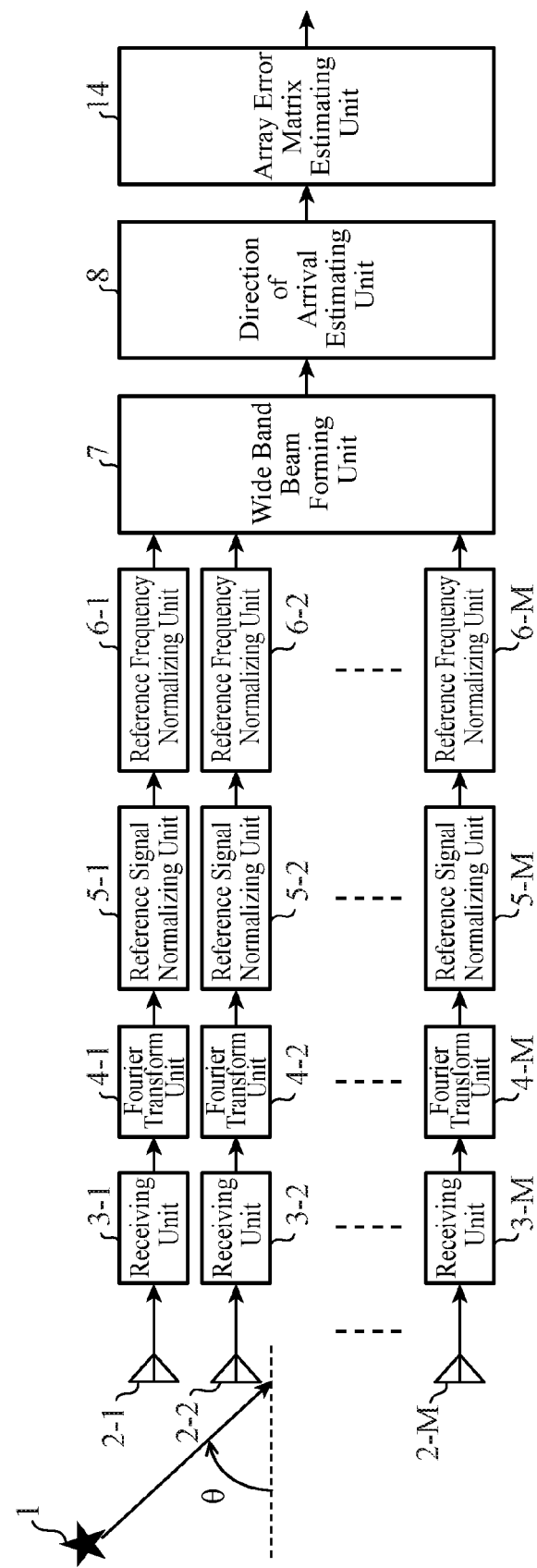
FIG. 4 is a block diagram showing a calibration device according to Embodiment 4 of the present invention.

FIG. 4 is a block diagram showing a calibration device according to Embodiment 4 of the present invention. In the figure, because the same reference numerals as those shown in FIG. 1 denote the same components or like components, the explanation of the components will be omitted hereafter.

An array error matrix estimating unit 14 is comprised of, for example, a semiconductor integrated circuit equipped with a CPU, or a one chip microcomputer, and performs a process of using the direction of arrivals θ of a plurality of unknown signals, the direction of arrivals being estimated by a direction of arrival estimating unit 8, and frequency domain signals x[m, k] normalized by reference signal normalizing units 5-1 to 5-M, to calculate an array error matrix C having dimensions of (the number M of reception antennas 2-1 to 2-M)×(the number M-tilde of directions of arrival estimated by the direction of arrival estimating unit 8), and estimating amplitude errors and phase errors occurring in the reception antennas 2-1 to 2-M from the array error matrix C for each of the directions of arrival θ of the signals. The array error matrix estimating unit 14 constructs an amplitude and phase error estimator.

Next, operations will be explained.

The direction of arrival estimating unit 8 estimates the direction of arrival θ of each unknown signal by using the same method as that according to above-mentioned Embodiment 1. In this Embodiment 4, it is assumed that the direction of arrival estimator can estimate the directions of arrival θ of M-tilde unknown signals.

After the direction of arrival estimating unit 8 estimates the directions of arrival θ of the M-tilde unknown signals, the array error matrix estimating unit 14 calculates an array error matrix C having the dimensions of M×M-tilde by using both the directions of arrival θ of the M-tilde unknown signals and the frequency domain signals x[m, k] normalized by the reference signal normalizing units 5-1 to 5-M.

When the directions of arrival θ of the M-tilde unknown signals are estimated, each frequency domain signal x can be modeled, as shown in the following equation (5).

$$X \equiv \begin{bmatrix} x_1(\theta_1, f) & x_1(\theta_2, f) & x_1(\theta_{\tilde{M}}, f) \\ x_2(\theta_1, f) & x_2(\theta_2, f) & x_2(\theta_{\tilde{M}}, f) \\ \vdots & \vdots & \vdots \\ x_M(\theta_1, f) & x_M(\theta_2, f) & x_M(\theta_{\tilde{M}}, f) \end{bmatrix} = \begin{bmatrix} c_{11} & \cdots & c_{1M} \\ \vdots & & \vdots \\ c_{M1} & \cdots & c_{MM} \end{bmatrix} \cdot \begin{bmatrix} a_1(\theta_1, f) & a_1(\theta_2, f) & \cdots & a_1(\theta_{\tilde{M}}, f) \\ a_2(\theta_1, f) & a_2(\theta_2, f) & & a_2(\theta_{\tilde{M}}, f) \\ \vdots & \vdots & & \vdots \\ a_M(\theta_1, f) & a_M(\theta_2, f) & \cdots & a_M(\theta_{\tilde{M}}, f) \end{bmatrix} = CA \quad (5)$$

From the equation (5), the array error matrix C can be calculated as follows.

$$C = XA^H(AA^H)^{-1} \quad (6)$$

After calculating the array error matrix C, the array error matrix estimating unit 14 calculates amplitude errors and phase errors occurring in the reception antennas 2-1 to 2-M from the array error matrix C for each of the directions of arrival θ of the signals.

As can be seen from the above description, because the calibration device according to this Embodiment 4 is configured in such a way that the array error matrix estimating unit 14 uses the directions of arrival θ of a plurality of unknown signals, the directions of arrival being estimated by the direction of arrival estimating unit 8, and frequency domain signals x[m, k] normalized by the reference signal normalizing units 5-1 to 5-M, to calculate an array error matrix C having dimensions represented by a product of (the number M of reception antennas 2-1 to 2-M) and (the number M-tilde of directions of arrival estimated by the direction of arrival estimating unit 8), and estimates amplitude errors and phase errors occurring in the reception antennas 2-1 to 2-M from the array error matrix C for each of the directions of arrival θ of the signals, there is provided an advantage of being able to, when the directions of arrival θ of the M-tilde unknown signals are estimated by the direction of arrival estimating unit 8, estimate amplitude errors and phase errors occurring in the reception antennas 2-1 to 2-M for each of the directions of arrival θ of the signals.

Embodiment 5

Although in above-mentioned Embodiments 1 to 3 the example in which only one wave of an unknown signal whose direction of arrival θ is to be estimated is incident within a period of time during which the Fourier transform units 4-1 to 4-M perform respective FFTs on the baseband complex signals is explained, the calibration device can be configured in such away as to, when a plurality of waves of unknown signals whose directions of arrival θ are to be estimated are incident, estimate the directions of arrival θ of the plurality of unknown signals.

Figure 5:
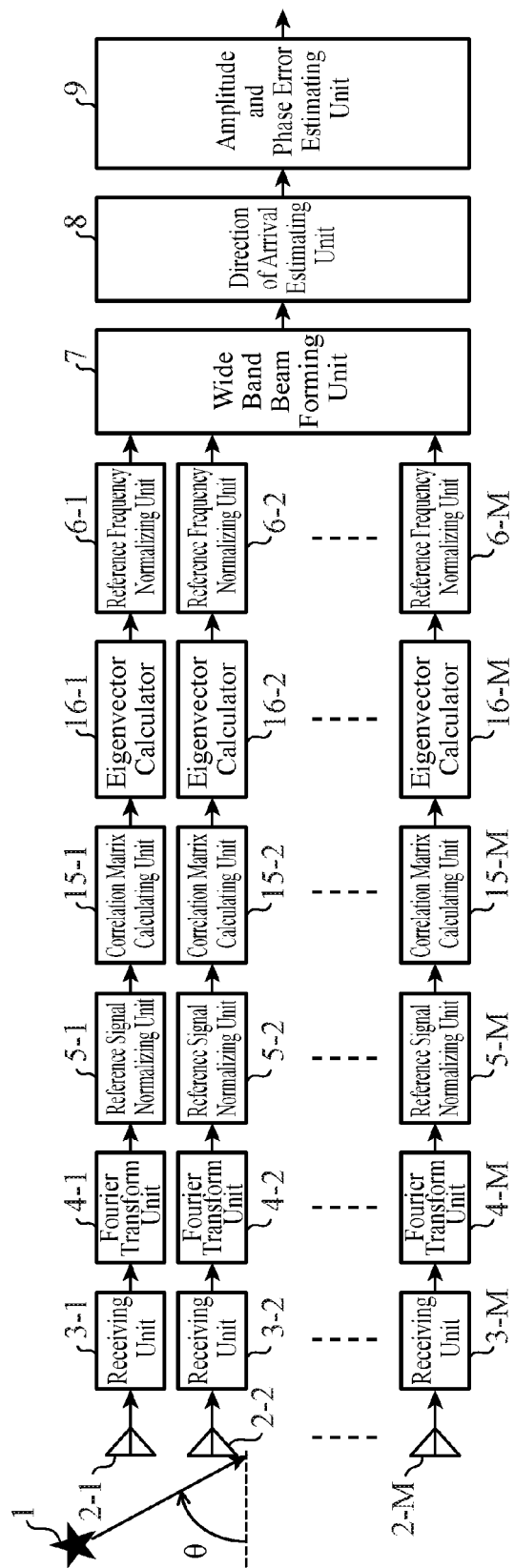
FIG. 5 is a block diagram showing a calibration device according to Embodiment 5 of the present invention.

FIG. 5 is a block diagram showing a calibration device according to Embodiment 5 of the present invention. In the figure, because the same reference numerals as those shown in FIG. 1 denote the same components or like components, the explanation of the components will be omitted hereafter.

Correlation matrix calculating units 15-1 to 15-M are comprised of, for example, a semiconductor integrated circuit equipped with a CPU, or a one chip microcomputer, and each of the correlation matrix calculators performs a process of extracting plural pieces of frequency data from a corresponding one of frequency domain signals x[m, k] normalized by reference signal normalizing units 5-1 to 5-M, and calculating correlation matrices R of the plural pieces of frequency data. The correlation matrix calculating units 15-1 to 15-M construct a correlation matrix calculator.

Eigenvector calculators 16-1 to 16-M are comprised of, for example, a semiconductor integrated circuit equipped with a CPU, or a one chip microcomputer, and each of the eigenvector calculators performs a process of identifying eigenvectors corresponding to a plurality of unknown signals which are received by reception antennas 2-1 to 2-M and whose directions of arrival differ from one another from the correlation matrices R calculated by the corresponding one of the correlation matrix calculating units 15-1 to 15-M, and outputting, as the frequency domain signal x[m, k] normalized by the corresponding one of the reference signal normalizing units 5-1 to 5-M, the eigenvectors to a corresponding one of reference frequency normalizing units 6-1 to 6-M. The eigenvector calculators 16-1 to 16-M construct an eigenvector identifier.

Next, operations will be explained.

When the reference signal normalizing units 5-1 to 5-M normalize frequency domain signals, like that according to above-mentioned Embodiment 1, each of the correlation matrix calculating units 15-1 to 15-M extracts, for example, K-tilde pieces of frequency data from the normalized frequency domain signal x[m, k].

After extracting the K-tilde pieces of frequency data, each of the correlation matrix calculating units 15-1 to 15-M calculates correlation matrices of those frequency data.

For example, the correlation matrix $R_{xx, m, l}$ of the l-th frequency data can be calculated, as shown in the following equation (7).

$$R_{xx,m,l} = x_{m,l} x_{m,l}^H \qquad (7)$$

After calculating the correlation matrix $R_{xx, m, l}$ of the l-th frequency data, each of the correlation matrix calculating units 15-1 to 15-M shifts the correlation matrix $R_{xx, m, l}$ in a frequency direction, thereby averaging the correlation matrix $R_{xx, m, l}$ L (=K−K-tilde+1) times.

The correlation matrix $R_{xx, m}$ after the averaging in the frequency direction can be calculated, as shown in the following equation (8).

$$R_{xx,m} = \frac{1}{L} \sum_{l=1}^{L} x_{m,l} x_{m,l}^H \qquad (8)$$

After each of the correlation matrix calculating units 15-1 to 15-M averages the correlation matrix $R_{xx, m, l}$ L times, each of the eigenvector calculators 16-1 to 16-M performs eigenvalue expansion of the correlation matrix $R_{xx, m}$ after the averaging, to identify the eigenvectors corresponding to the plurality of unknown signals which are received by the reception antennas 2-1 to 2-M and whose directions of arrival differ from one another.

For example, under a situation in which the received signals of N waves are simultaneously incident, each of the eigenvector calculators identifies the N higher-order eigenvalues having larger values from among the eigenvalues of the correlation matrix $R_{xx, m}$ after the averaging, and identifies the N eigenvectors corresponding to the N higher-order eigenvalues. The N eigenvectors correspond to the frequency domain signals associated with the received signals of N waves.

After identifying the N eigenvectors corresponding to the N higher-order eigenvalues, each of the eigenvector calculators 16-1 to 16-M outputs, as the corresponding one of the frequency domain signals x[m, k] normalized by the reference signal normalizing units 5-1-to 5-M, the N eigenvectors to the corresponding one of the reference frequency normalizing units 6-1 to 6-M.

By performing the identification of the eigenvectors independently for each reception antenna 2, and bringing eigenvectors having eigenvalues close to each other into correspondence with each other among reception antennas 2, the frequency domain signal associated with the same direction of arrival θ can be estimated for each reception antenna 2.

As can be seen from the above description, because the calibration device according to this Embodiment 5 is configured in such a way as to include the correlation matrix calculating units 15-1 to 15-M each of that extracts plural pieces of frequency data from the frequency domain signal x[m, k] normalized by the corresponding one of the reference signal normalizing units 5-1 to 5-M, and calculates correlation matrices R of the plural pieces of frequency data, and the eigenvector calculators 16-1 to 16-M each of that identifies eigenvectors corresponding to a plurality of unknown signals which are received by the reception antennas 2-1 to 2-M and whose directions of arrival differ from one another from the correlation matrices R of the frequency domain signal, which are calculated by the corresponding one of the correlation matrix calculating units 15-1 to 15-M, and outputs, as the frequency domain signal x[m, k] normalized by the corresponding one of the reference signal normalizing units 5-1 to 5-M, the plurality of eigenvectors to the corresponding one of the reference frequency normalizing units 6-1 to 6-M, there is provided an advantage of being able to estimate the directions of arrival θ of the unknown signals emitted from the plurality of radiation sources 1.

Embodiment 6

Although in above-mentioned Embodiments 1 to 5 the example in which a signal whose direction of arrival θ is unknown is emitted from the radiation source 1, the calibration device can have a radar configuration for emitting a signal therefrom.

Figure 6:
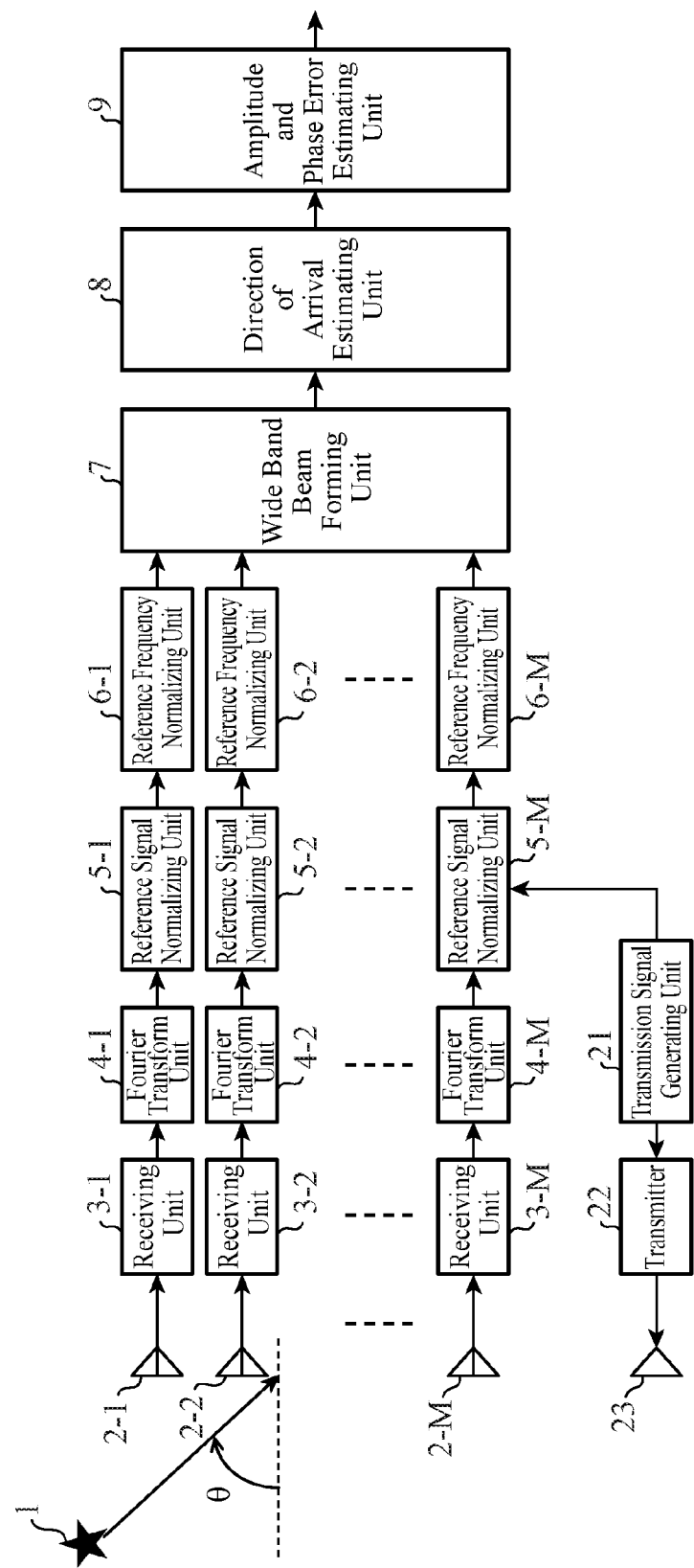
FIG. 6 is a block diagram showing a calibration device according to Embodiment 6 of the present invention.

FIG. 6 is a block diagram showing a calibration device according to Embodiment 6 of the present invention. In the figure, because the same reference numerals as those shown in FIG. 1 denote the same components or like components, the explanation of the components will be omitted hereafter.

A transmission signal generating unit 21 generates a baseband signal (e.g., a linearity frequency modulation signal, a code modulation signal or a CW signal) used typically in a radar.

A transmitter 22 performs various signal processes (e.g., a signal amplification process, a band-pass filter process and a frequency conversion process) on the baseband signal generated by the transmission signal generating unit 21, to acquire an RF signal (transmission signal), and outputs the RF signal to a transmission antenna 23. A signal generator is comprised of the transmission signal generating unit 21 and the transmitter 22.

The transmission antenna 23 emits the RF signal outputted from the transmitter 22 into space.

Next, operations will be explained.

The transmission signal generating unit 21 generates a baseband signal used typically in a radar, and outputs the baseband signal to the transmitter 22.

The transmission signal generating unit 21 also performs an FFT on the baseband signal, thereby converting the baseband signal into a signal in a frequency domain, and outputs the frequency domain signal to reference signal normalizing units 5-1 to 5-M.

The reference signal normalizing units 5-1 to 5-M can set, as a reference signal, a frequency domain signal associated with either one 2 of reception antennas and included in frequency domain signals obtained by the conversion made by Fourier transform units 4-1 to 4-M, like those according to above-mentioned Embodiment 1. The reference signal normalizing units can alternatively set, as the reference signal, the frequency domain signal outputted from the transmission signal generating unit 21.

When receiving the baseband signal from the transmission signal generating unit 21, the transmitter 22 performs the various signal processes on the baseband signal to acquire an RF signal, and outputs the RF signal to the transmission antenna 23.

As a result, the RF signal is emitted into space from the transmission antenna 23. The RF signal emitted into the space is received by the reception antennas 2-1 to 2-M after being reflected by a reflector existing in the space.

Because the details of subsequent processes are the same as those explained in above-mentioned Embodiment 1, a detailed explanation of the subsequent processes will be omitted hereafter.

Embodiment 7

Although in above-mentioned Embodiments 1 to 6 the example in which the direction of arrival estimating unit 8 detects the peak of the beam pattern P (θ-tilde) formed by the wide band beam forming unit 7 to estimate the direction of arrival θ of a signal emitted from the radiation source 1, and, after that, the amplitude and phase error estimator 9 estimates amplitude errors and phase errors occurring in the reception antennas 2-1 to 2-M by using both the direction of arrival θ estimated by the direction of arrival estimating unit 8 and the frequency domain signals x[m, k] normalized by the reference signal normalizing units 5-1 to 5-M is shown, the calibration device can estimate simultaneously the direction of arrival θ of a signal emitted from the radiation source 1, and amplitude errors and phase errors occurring in the reception antennas 2-1 to 2-M.

Figure 7:
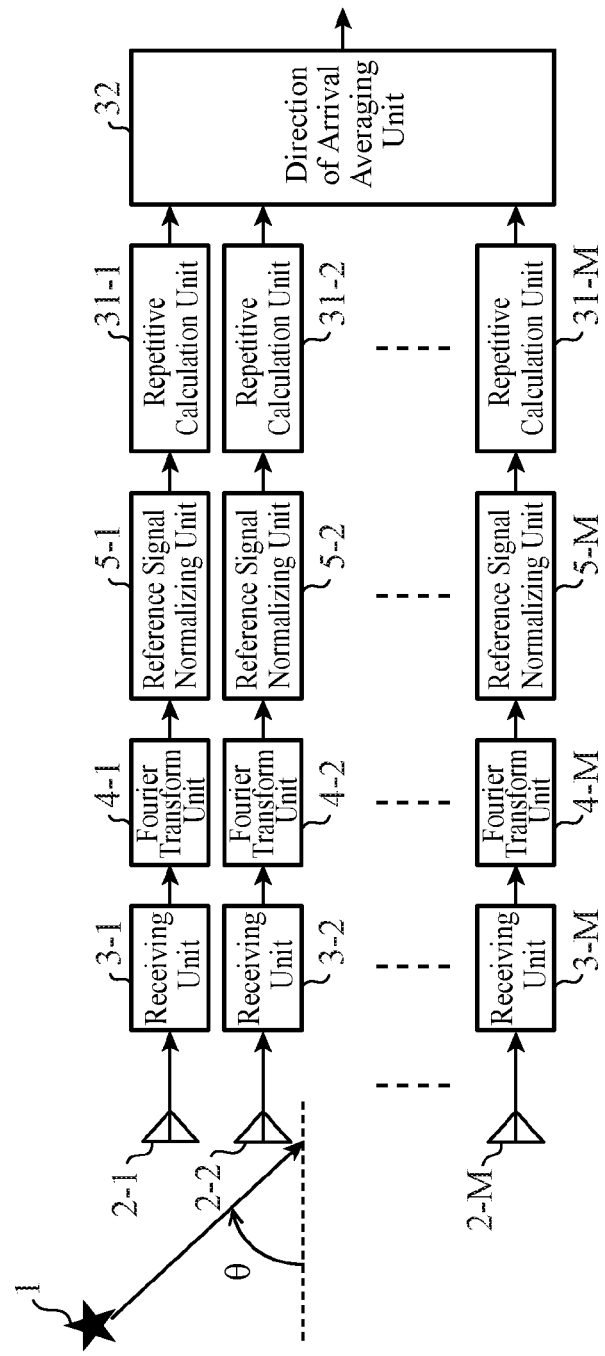
FIG. 7 is a block diagram showing a calibration device according to Embodiment 7 of the present invention.

FIG. 7 is a block diagram showing a calibration device according to Embodiment 7 of the present invention. In the figure, because the same reference numerals as those shown in FIG. 1 denote the same components or like components, the explanation of the components will be omitted hereafter.

Repetitive calculation units 31-1 to 31-M are comprised of, for example, a semiconductor integrated circuit equipped with a CPU, or a one chip microcomputer, and each of the repetitive calculations units performs repetitive calculations of an amplitude error and a phase error which are indicated by the complex amplitude $\gamma_m(f)$ for a corresponding one of reception antennas 2-1 to 2-M, together with the direction of arrival θ of an unknown signal, by using a frequency domain signal x[m, k] normalized by a corresponding one of reference signal normalizing units 5-1 to 5-M, a steering vector determined from the direction of arrival θ and the position of the corresponding one of the reception antennas 2-1 to 2-M, and a differential value acquired by differentiating the steering vector with respect to the direction of arrival θ. The repetitive calculation unit 31-1 to 31-M construct an amplitude and phase error estimator.

A direction of arrival averaging unit 32 is comprised of, for example, a semiconductor integrated circuit equipped with a CPU, or a one chip microcomputer, and performs a process of calculating the average of the directions of arrival θ repeatedly calculated by the repetitive calculations unit 31-1 to 31-M.

Next, operations will be explained.

When the reference signal normalizing units 5-1 to 5-M normalize frequency domain signals obtained by the conversion made by Fourier transform units 4-1 to 4-M, like those according to above-mentioned Embodiment 1, each of the repetitive calculation units 31-1 to 31-M generates a linear equation as shown in the following equation (9) by using the normalized frequency domain signal x[m, k], the steering vector determined from the direction of arrival θ of an unknown signal and the position of the corresponding one of the reception antennas 2-1 to 2-M, and a differential value acquired by differentiating the steering vector with respect to the direction of arrival θ.

$$\begin{bmatrix} x_m(f_c) \\ x_m(f_c + k\Delta f) \end{bmatrix} \approx \begin{bmatrix} a_m(\theta_0, f) & \dfrac{\partial a_m(\theta_0, f)}{\partial \theta} \\ a_m(\theta_0, f + \Delta f) & \dfrac{\partial a_m(\theta_0, f + \Delta f)}{\partial \theta} \end{bmatrix} \cdot \begin{bmatrix} \gamma_m \\ \gamma_m \Delta \theta \end{bmatrix} \quad (9)$$

In the equation (9), $a_m(\theta_0, f)$ and $a_m(\theta_0, f+\Delta f)$ in a matrix of 2 rows and 2 columns on the right-hand side are the steering vector, and $\delta a_m(\theta_0, f)/\delta\theta$ and $\delta a_m(\theta_0, f+\Delta f)/\delta\theta$ are the differential value acquired by differentiating the steering vector with respect to the direction of arrival θ.

After generating the linear equation, each of the repetitive calculations units 31-1 to 31-M performs repetitive calculations, thereby simultaneously estimating the direction of arrival θ of the unknown signal, and the amplitude error and the phase error which are indicated by the complex amplitude $\gamma_m(f)$ for the corresponding one of the reception antennas 2-1 to 2-M.

After the repetitive calculation units 31-1 to 31-M estimate the directions of arrival θ of the unknown signal, the direction of arrival averaging unit 32 calculates the average of those directions of arrival θ.

As can be seen from the above description, because the calibration device according to this Embodiment 7 is configured in such a way that each of the repetitive calculations units 31-1 to 31-M performs repetitive calculations of the amplitude error and the phase error which are indicated by the complex amplitude $\gamma_m(f)$ for the corresponding one of the reception antennas 2-1 to 2-M, together with the direction of arrival θ of an unknown signal, by using the frequency domain signal x[m, k] normalized by the corresponding one of the reference signal normalizing units 5-1 to 5-M, the steering vector determined from the direction of arrival θ and the position of the corresponding one of the reception antennas 2-1 to 2-M, and a differential value acquired by differentiating the steering vector with respect to the direction of arrival θ, there is provided an advantage of being able to estimate amplitude errors and phase errors occurring in the plurality of reception antennas 2-1 to 2-M while estimating the direction of arrival θ of an unknown signal with a high degree of accuracy, without preparing, in advance, a radiation source that emits a signal whose direction of arrival is known, like in the case of above-mentioned Embodiment 1.

While the invention has been described in its preferred embodiments, it is to be understood that an arbitrary combination of two or more of the above-mentioned embodiments can be made, various varies can be made in an arbitrary component according to any one of the above-mentioned embodiments, and an arbitrary component according to any one of the above-mentioned embodiments can be omitted within the scope of the invention.

INDUSTRIAL APPLICABILITY

The present invention is suitable for a calibration device that, even if a secular change occurs in the amplitude error and/or phase error occurring in each antenna, needs to compensate for the amplitude error and/or phase error, without preparing, in advance, a radiation source that emits a signal whose direction of arrival is known.

REFERENCE SIGNS LIST

1: radiation source, 2-1 to 2-M: reception antenna (element antenna), 3-1 to 3-M: receiving unit (signal converter), 4-1 to 4-M: Fourier transform unit (signal converter), 5-1 to 5-M: reference signal normalizing unit (reference signal normalizer), 6-1 to 6-M: reference frequency normalizing unit (reference frequency normalizer), 7: wide band beam forming unit (direction of arrival estimator), 8: direction of arrival estimating unit (direction of arrival estimator), 9: amplitude and phase error estimating unit (amplitude and phase error estimator), 11-1 to 11-M: band dividing unit (band divider), 12-1 to 12-M: reference frequency normalizing unit (reference frequency normalizer), 13-1 to 13-M: cross correlation calculating unit (cross correlation calculator), 14: array error matrix estimating unit (amplitude and phase error estimator), 15-1 to 15-M: correlation matrix calculating unit (correlation matrix calculator), 16-1 to 16-M: eigenvector calculator (eigenvector identifier), 21: transmission signal generating unit (signal generator), 22: transmitter (signal generator), 23: transmission antenna, 31-1 to 31-M: repetitive calculation unit (amplitude and phase error estimator), and 32: direction of arrival averaging unit.

The invention claimed is:

1. A calibration device comprising:
an array antenna to receive an unknown signal whose direction of arrival is unknown;
a signal converter to convert signals received by a plurality of element antennas which construct said array antenna, into frequency domain signals;
a reference signal normalizer to set, as a reference signal, either a frequency domain signal being associated with either one of the element antennas and being selected from among said frequency domain signals obtained by the conversion made by said signal converter, or a frequency spectrum of said unknown signal acquired in advance, and to normalize said frequency domain signals by using said reference signal;
a reference frequency normalizer to normalize the frequency domain signals normalized by said reference signal normalizer, by using a signal having a reference frequency which is included in the frequency domain signals normalized by said reference signal normalizer;
a direction of arrival estimator to estimate the direction of arrival of said unknown signal by using the frequency domain signals normalized by said reference frequency normalizer; and
an amplitude and phase error estimator to estimate amplitude errors and phase errors occurring in said plurality of antennas by using both the direction of arrival estimated by said direction of arrival estimator and the frequency domain signals normalized by said reference signal normalizer.

2. The calibration device according to claim 1, further comprising a band divider to divide the frequency domain signals normalized by said reference signal normalizer into signals in frequency bands, wherein
for each of the frequency bands obtained by the division performed by said band divider, said reference frequency normalizer normalizes the signals in the frequency bands in the frequency domain, by using a signal having a reference frequency included in the signals in the frequency bands in the frequency domain.

3. The calibration device according to claim 1, further comprising a cross correlation calculator to set, as a reference signal, either one of the signals received by said plurality of element antennas or said unknown signal acquired in advance, to calculate cross correlations between the signals received by said plurality of element antennas and said reference signal, to perform an SNR improving process of improving signal-to-noise power ratios of said received signals by using results of the cross correlations, and to output the received signals obtained by the SNR improving process to said signal converter.

4. The calibration device according to claim 1, wherein:
said direction of arrival estimator estimates directions of arrival of a plurality of unknown signals which are received by said array antenna and whose directions of arrival differ from one another; and
said amplitude and phase error estimator calculates an array error matrix having dimensions represented by a product of a number of element antennas which construct said array antenna, and a number of directions of arrival estimated by said direction of arrival estimator, by using both the directions of arrival of the plurality of unknown signals estimated by said direction of arrival estimator and the frequency domain signals normalized by said reference signal normalizer, and estimates the amplitude errors and the phase errors occurring in said plurality of antennas from said array error matrix.

5. The calibration device according to claim 1, further comprising:
- a correlation matrix calculator to extract plural pieces of frequency data from each of the frequency domain signals normalized by said reference signal normalizer, and to calculate correlation matrices of said plural pieces of frequency data; and
- an eigenvector identifier to identify eigenvectors corresponding to a plurality of unknown signals which are received by said array antenna and whose directions of arrival differ from one another from the correlation matrices calculated by said correlation matrix calculator, and to output said eigenvectors, as the frequency domain signals normalized by said reference signal normalizer, to said reference frequency normalizer.

6. The calibration device according to claim 1, further comprising:
- a signal generator to generate a transmission signal; and
- a transmission antenna to emit the transmission signal generated by said signal generator into space, wherein said array antenna receives a reflected wave of said transmission signal emitted from said transmission antenna, the reflected wave being reflected by a reflector existing in said space.

7. A calibration device comprising:
- an array antenna to receive an unknown signal whose direction of arrival is unknown;
- a signal converter to convert signals received by a plurality of element antennas which construct said array antenna, into frequency domain signals;
- a reference signal normalizer to set, as a reference signal, either a frequency domain signal being associated with either one of the element antennas and being selected from among said frequency domain signals obtained by the conversion made by said signal converter, or a frequency spectrum of said unknown signal acquired in advance, and to normalize said frequency domain signals by using said reference signal; and
- an amplitude and phase error estimator to repeatedly calculate amplitude errors and phase errors occurring in said plurality of antennas together with said direction of arrival, by using the frequency domain signals normalized by said reference signal normalizer, a steering vector determined from the direction of arrival of said unknown signal and positions of said plurality of element antennas, and a differential value acquired by differentiating said steering vector with respect to said direction of arrival.

* * * * *